(12) United States Patent
Helskens et al.

(10) Patent No.: US 12,012,363 B2
(45) Date of Patent: Jun. 18, 2024

(54) NON-STICK CERAMIC COATING COMPRISING DIAMONDS AND COLOURED MICA

(71) Applicant: Thermolon Korea Co. Ltd., Busan (KR)

(72) Inventors: Jan Helskens, Destelbergen (BE); Chung Kwon Park, Busan (KR)

(73) Assignee: THERMOLON KOREA CO. LTD., Busan (KR)

( * ) Notice: Subject to any disclaimer, the term of this patent is extended or adjusted under 35 U.S.C. 154(b) by 868 days.

(21) Appl. No.: 16/966,749

(22) PCT Filed: Feb. 5, 2019

(86) PCT No.: PCT/EP2019/052795
§ 371 (c)(1),
(2) Date: Jul. 31, 2020

(87) PCT Pub. No.: WO2019/154816
PCT Pub. Date: Aug. 15, 2019

(65) Prior Publication Data
US 2020/0361824 A1 Nov. 19, 2020

(30) Foreign Application Priority Data
Feb. 6, 2018 (EP) .................................. 18155281

(51) Int. Cl.
| C04B 35/14 | (2006.01) |
| A47J 36/02 | (2006.01) |
| A47J 36/04 | (2006.01) |
| C04B 35/622 | (2006.01) |
| C04B 35/624 | (2006.01) |
| C04B 35/628 | (2006.01) |

(52) U.S. Cl.
CPC ............. *C04B 35/14* (2013.01); *A47J 36/025* (2013.01); *A47J 36/04* (2013.01); *C04B 35/62222* (2013.01); *C04B 35/624* (2013.01); *C04B 35/62821* (2013.01); *C04B 2235/3232* (2013.01); *C04B 2235/3418* (2013.01); *C04B 2235/3427* (2013.01); *C04B 2235/427* (2013.01); *C04B 2235/483* (2013.01); *C04B 2235/9669* (2013.01)

(58) Field of Classification Search
None
See application file for complete search history.

(56) References Cited

U.S. PATENT DOCUMENTS

| 3,970,627 | A | 7/1976 | Seymus |
| 4,361,622 | A | 11/1982 | Theisen et al. |
| 5,194,336 | A | 3/1993 | Yamada |
| 9,814,349 | B2 | 11/2017 | Dubanchet et al. |
| 10,793,477 | B2 | 10/2020 | Helskens et al. |
| 2004/0261932 | A1 | 12/2004 | Buffard et al. |
| 2014/0120284 | A1 | 5/2014 | Perillon et al. |
| 2015/0201799 | A1 | 7/2015 | Dubanchet et al. |
| 2018/0170815 | A1 | 6/2018 | Helskens et al. |

FOREIGN PATENT DOCUMENTS

| CN | 1053580 | A | 8/1991 |
| CN | 103289565 | A | 9/2013 |
| CN | 104135902 | A | 11/2014 |
| CN | 107660226 | A | 2/2018 |
| EP | 2728040 | A1 | 5/2014 |
| JP | H03211051 | A | 9/1991 |
| WO | 2016188946 | A1 | 12/2016 |

OTHER PUBLICATIONS

International Search Report dated May 8, 2019 from PCT International Appln. No. PCT/EP2019/052795.
Written Opinion dated May 8, 2019 from PCT International Appln. No. PCT/EP2019/052795.

*Primary Examiner* — Colin W. Slifka
(74) *Attorney, Agent, or Firm* — Amster, Rothstein & Ebenstein LLP

(57) ABSTRACT

The present invention relates to an enhanced ceramic coating composition comprising a base non-stick ceramic coating composition and 0.2 wt %-2 wt % diamond additive (DA) with wt % compared with the total weight compared of the ceramic coating composition, wherein the diamond additive comprises diamond and mica particles, and wherein said mica particles comprise coloured mica particles, such as red and/or green and/or blue coloured mica particles. It also relates to a method of coating an artefact with the improved ceramic coating, and an artefact provided with a dry film coating containing an improved ceramic coating prepared using an improved ceramic coating composition of the invention. An artefact coated with the improved ceramic coating has the combined advantages of durable non-stick, scratch resistance and abrasion resistance.

18 Claims, No Drawings

NON-STICK CERAMIC COATING COMPRISING DIAMONDS AND COLOURED MICA

CROSS-REFERENCE TO RELATED APPLICATIONS

This application is a U.S. national stage entry under 35 U.S.C. § 371 of PCT International Patent Application No. PCT/EP2019/052795, filed Feb. 5, 2019, which claims priority to European Patent Application No. 18155281.1, filed Feb. 6, 2018, the contents of each of which are incorporated herein by reference in their entirety.

FIELD OF THE INVENTION

The present invention relates to an improved ceramic coating and ceramic coating composition for an artefact that provides a durable and long-lasting non-stick property, in particular an increased salt water boiling resistance, in addition to improved hardness, abrasion resistance, scratch resistance and thermal conductivity. It also relates to an artefact coated with the improved ceramic coating. It also relates to a use of the improved ceramic coating for coating an artefact, for instance a cookware item.

BACKGROUND OF THE INVENTION

Non-stick coatings have many applications, for instance, in cookware, small domestic electrical appliances and ovenware such as pots, pans, bakeware and other cooking utensils and appliances. It can also be applied on metal cutlery such as knives (knife blades) or other utensils where a hard, scratch-resistant surface combined with low friction and easy cleaning is advantageous. It can also be applied in various types of heaters (e.g. wood burning stoves, heating boilers, infra-red heaters etc), gas burner rings, ovens, oven cavities fans, refrigerators, irons, building materials, health aids, personal care products such as hair straighteners, curling tongs, water heating elements, and industrial products or equipment or processing equipment such as moulds, conveyor belts, heat exchanger surface, or other surfaces where easy cleaning, food release, corrosion resistance or low fraction is a requirement.

A problem in the art is that these coatings, particularly when used in cookware, need to withstand surface abrasions and scratches and exposure to high (cooking) temperatures and salty cooking media, whilst maintaining a non-stick function and without degradation. Indeed, heat and heat shock damage contribute to the loss of the non-stick effect over time, causing e.g. a loss of structural integrity of the coating surface. Cooking with salty foods or salty cooking media is also another well-known cause of loss of non-stick properties. In this context, the HomeWorld Forecast 2014, a consumer survey, concluded that about 53% of respondents stated they would purchase ceramic non-stick cookware in a next cookware purchase. Almost half of the consumers stated that it is most important that a non-stick surface hold its easy food release (non-stick) properties over time. In this context, the salt water boiling resistance is one of the most commonly cited weaknesses of a ceramic non-stick coating which is known to result in loss of the non-stick (food release) properties EP2728040 discloses a diamond containing ceramic coating composition comprising colloidal silica, methyltrimethoxysilane, demineralized water, isopropanol, (nonreactive) silicone oil, pigment and diamond powder. Mica particles may be present in the composition as a pigment or as a structural, but inert filler. While the cured coating of EP2728040 has an improved scratch resistance and thermal conduction properties compared to a coating without the diamond particles, EP2728040 is silent on the durability of the non-stick properties. In fact, the addition of the silicone oil to the sol-gel aims to improve its non-stick properties, but its benefit is temporary and the initial non-stick properties are quickly lost.

WO2016188946 discloses a non-stick ceramic coating composition comprising a diamond additive, comprising diamonds and, optionally, mica. In WO2016188946, the mica is included in the diamond additive to provide a metallic glitter or reflective speckling effect. In addition to an improved scratch resistance, the enhanced ceramic coating disclosed in WO2016188946 has an improved non-stick durability, in particular the enhanced ceramic coating maintained its non-stick performance to a greater extent when subject to successive thermal shock treatments.

Accordingly, while diamond containing ceramic non-stick coatings are known in the art for having improved stability at higher temperatures and for having an improved abrasion resistance and thermal conductivity properties, there remains a need in the art for improved non-stick ceramic coatings, in particular having an increased salt water boiling resistance. Salt is a common ingredient in cooking, and, accordingly, in daily use, a non-stick ceramic coating will be regularly in contact with hot salt containing products or liquids. There is thus a need for a non-stick ceramic coating with an even higher durability of the non-stick performance when in contact with a hot salty product, for instance for use on any artefact, in particular for non-stick coatings on a cookware item.

SUMMARY OF THE INVENTION

Through extensive experimental formulation and testing, the present inventors have realised an improved ceramic coating composition overcoming at least some of the problems of the prior art, particularly which has an even more durable and use-resistant non-stick effect compared to the ceramic coatings of the prior art, including diamond containing ceramic coatings. Especially, in the current invention, the resistance of the non-stick properties to cooking with salty foods and liquids has been synergistically enhanced over and above what was considered possible with the diamond containing ceramic coating of WO2016188946.

A first aspect of the present invention provides a ceramic coating composition for providing a non-stick ceramic coating when applied on an artefact, comprising a base ceramic coating composition and 0.2 wt %-2 wt % of a diamond additive, with wt % compared with the total weight of the ceramic coating composition, wherein the diamond additive comprises diamond particles and mica particles, wherein said mica particles comprises coloured mica particles, preferably wherein said mica particles are blue and/or green and/or red coloured mica particles.

In particular embodiments, said coloured mica particles comprise natural or synthetic mica particles coated with a titanium dioxide and/or metal oxide layer. The thickness of the titanium dioxide and/or metal oxide layer is preferably between 80 and 160 nm, preferably between 90 and 150 nm.

In particular embodiments, the weight ratio diamond particles:mica particles in the diamond additive as envisaged herein ranges between 1:0.1 and 1:3, preferably between 1:1 and 1:3.

In particular, the base ceramic coating composition is a ceramic coating composition comprising silica or zirconia.

In certain embodiments, the base ceramic coating composition is present at more than 90 wt % in said ceramic coating composition, with wt % compared with the total weight of the ceramic coating composition.

In certain embodiments, said base ceramic coating composition is a non-stick inorganic ceramic coating composition, a non-stick hybrid ceramic coating composition, or a non-stick sol-gel ceramic coating composition.

In a particular embodiment, said base ceramic coating composition is a sol-gel ceramic coating composition comprising:
  (a) 11-20 wt % of a silane or an oligomer thereof as a binder;
  (b) 19.5-41.5 wt % of a silica mixture;
  (c) 0-19 wt %, preferably 3-19 wt % of a functional filler;
  (d) 2-15 wt % a ceramic powder that emits far infrared radiation and anions;
with wt % compared with the total weight of the sol-gel ceramic composition.

Preferably, said ceramic powder that emits far-infrared radiation and anions comprises a far-infrared radiation-emitting material and an anion-emitting element.

Another aspect of the present invention provides the use of a ceramic coating composition according to the present invention for coating an artefact, in particular a cookware item.

Another aspect of the present invention relates to an artefact, in particular a cookware item or a metal cutlery item, such as a knife, provided with a dry film non-stick ceramic coating comprising diamond particles and blue and/or green and/or red mica particles, preferably wherein the total thickness of the dry film is 20-60 μm. The dry film non-stick ceramic coating contains a ceramic coating composition as envisaged herein, and has (i) a scratch resistance of 10 to 15 N as measured by BS7069; (ii) an abrasion resistance of 20 000 to 90 000 cycles by using a force of 45 N according to BS7069; (iii) a pencil hardness of greater than or equal to 10H at room temperature and at 200° C. according to EN 12983-1:1999; and/or a thermal conductivity of 2.4 to 2.8 W·m$^{-1}$ K$^{-1}$ measured according to ASTM E-1461.

Another aspect of the present invention provides a method for coating a surface of an artefact comprising the steps:
  A) roughening of the surface of the artefact,
  B) applying a base coat of a ceramic coating composition to the roughened surface,
  C) applying a top coat of the ceramic coating composition according to the present application over the wet base coat, and
  D) curing the base coat and top coat to obtain a dry film coating of the artefact.

In particular embodiments, the method for obtaining an artefact coated with the ceramic coating composition according to the present invention, comprising the steps of:
  providing an artefact;
  providing a first solution comprising a silica mixture, a functional filler, a ceramic powder that emits far-infrared ray-radiation and anions in a first container;
  providing a second solution comprising silane or an oligomer thereof as a binder in a second container;
  pre-agitating the first solution in the first container and the second solution in the second container;
  mixing the first solution and the second solution, thereby obtaining a sol-gel ceramic coating composition comprising 11-20 wt % of a silane or an oligomer thereof as a binder; 19.5-41.5 wt % of a silica mixture; 0-19 wt %, preferably 3-19 wt % of a functional filler; 2-15 wt % a ceramic powder that emits far infrared radiation and anions, with wt % compared with the total weight of the sol-gel ceramic composition;
  agitating and maturing the non-stick sol-gel ceramic composition;
  adding a diamond additive, comprising diamond particles and coloured mica particles, to the non-stick sol-gel ceramic composition to obtain a ceramic coating composition containing 0.2 wt %-2 wt % diamond additive according to the present invention;
  filtering the ceramic coating composition;
  applying the ceramic coating composition onto the artefact as a base coating or a further coating, preferably as a top coating; and
  curing the ceramic coating composition, thereby obtaining an artefact coated with a film containing the ceramic coating composition according to the present invention.

Another aspect of the present invention relates to a method for improving the salt water boiling resistance of the non-stick performance of a non-stick ceramic coating comprising adding 0.2 wt %-2 wt % of diamond additive to a ceramic coating composition, with wt % compared to the total weight of the non-stick ceramic coating composition, wherein said diamond additive comprises diamond particles and blue and/or green and/or red particles.

DETAILED DESCRIPTION OF THE INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of". The recitation of numerical ranges by endpoints includes all numbers and fractions subsumed within the respective ranges, as well as the recited endpoints.

All documents cited in the present specification are hereby incorporated by reference in their entirety.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to an improved ceramic coating and improved ceramic coating composition that has an improved durability of the coating's non-stick properties or non-stick release performance. In particular, the improved ceramic coating composition of the present invention, when applied on a surface, results in a non-stick ceramic coating on said surface exhibiting a surprisingly high salt water boiling resistance of the non-stick properties, in addition to enhanced properties of hardness, abrasion resistance, thermal conductivity and scratch resistance. The improved ceramic coating of the present invention has an enhanced durability when exposed to the conditions that prevail when in normal domestic use for which such articles are intended. As envisaged herein, the improved ceramic coating is non-stick, i.e. products, such as food during/after preparation, are easily released from the surface of the ceramic coating. The improved ceramic coating and improved ceramic coating composition finds many applications, for instance, in non-stick cookware, specifically, pots and pans for the oven or stove-top as well as in ovenware, bakeware and small domestic cooking appliances. The applications include those where a non-stick property is advantageous, such as oven cavities, gas burner rings, clothes irons, hair care products such as hair straighteners and curling irons. It can also be applied on metal cutlery such as knives or other utensils where a hard surface combined with low friction and easy cleaning is required. The applications include those where a non-stick property is not a requirement, such as in wood-burning-stoves, heating boilers, heaters in general. Other applications include health aids, building materials and industrial products.

By extensive experimental testing, the present inventors have realised further improvements in the field of non-stick ceramic coating and ceramic coating compositions. The inventors have surprisingly found that the combination of specific coloured mica particles, particularly blue and/or red and/or green mica particles, with diamond particles, has a synergistic effect on the performance and durability of diamond containing ceramic non-stick coatings, particularly with respect to the resistance of the coating to boiling salt water. In particular, the coating and coating compositions as described herein, comprising diamond particles and coloured mica particles, have a marked increase of the longevity of the non-stick property or the non-stick release performance, particularly the boiling salt water resistance of the non-stick property, compared to conventional (non-diamond) non-stick ceramic coatings, or even when compared to diamond containing enhanced ceramic coatings, such as e.g. disclosed in WO2016188946. Stated differently, the non-stick properties of the coating of the present invention have a superior wear resistance. The present inventors have surprisingly found that the addition of low levels of a diamond additive, comprising diamond particles and specific, coloured mica particles (particularly blue and/or green and/or red coloured mica particles), to a non-stick ceramic coating composition allowed them to obtain an improvement on the enhanced ceramic non-stick coating which combines a significant and synergistic increase in the durability and longevity of the non-stick properties with an increased abrasion and scratch resistance, enhanced salt water boiling resistance of the non-stick properties and an increased thermal conductivity (leading to lower thermal resistance to the flow of heat, thus enabling more rapid heating of the food contact surface of the cooking utensil and more homogenous heating). Advantageously, the ceramic coating and ceramic coating composition as envisaged herein demonstrate a longer lasting non-stick performance under conditions simulating domestic use (in particular a treatment comprising of one dishwasher cycle, 2 temperature treatments and a salt water boiling treatment, abbreviated as 1D+2TS+SW); have an exceptionally high salt water non-stick resistance; have an improved wear resistance of the non-stick properties and exhibit a significantly enhanced heat transfer.

A first aspect of the present invention generally provides a ceramic coating and improved ceramic coating composition comprising diamond particles and coloured mica particles wherein the coating when applied on an artefact has an increased durability of its non-stick properties, surprisingly even exceeding the non-stick durability of an enhanced ceramic coating (composition) comprising diamonds, optionally comprising non-coloured mica particles, such as disclosed in WO2016188946. The ceramic coating composition for a ceramic coating with durable non-stick properties according to the present invention comprises a base or conventional ceramic coating composition (also referred herein as CCC), as generally known in the art, to which a diamond additive (also referred to as DA) is added, wherein the diamond additive specifically comprises diamond particles and specific coloured mica particles, in particular blue and/or green and/or red coloured mica particles. The improved ceramic coating composition as envisaged herein may be applied to an artefact as a further non-stick layer (e.g. a top coat), over a base coat layer or bottom coat layer of a two-layer or multilayer non-stick coating. When the diamond additive as defined herein is added to the upper layer or top coat layer of e.g. a ceramic non-stick coating for cookware items, the diamonds and/or mica particles are present where they are the most useful, i.e. in the layer which is in contact with the food.

The improved ceramic coating according to the present invention has an improved durability of the coating's non-stick properties, or stated differently, the non-stick properties of the coating last longer, particularly when in contact with hot salty solutions or salty products. In addition, the improved ceramic coating as envisaged herein has an improved thermal conductivity when compared to the non-diamond additive coating derived from the corresponding base or conventional ceramic coating composition CCC, and even shows an improvement over the thermal conductivity of a ceramic coating comprising a diamond additive without coloured mica. The improved ceramic coating as taught herein may additionally also be decorative.

The improved ceramic coating composition according to the present invention, and which forms an improved ceramic coating when applied on an artefact, comprises a base or conventional ceramic coating composition, as generally known in the art and referred to herein as CCC, and between 0.1 wt % and 2 wt % diamond additive (DA), preferably between 0.1 wt % and 1 wt % diamond additive, with the wt % being relative to the total weight of the improved ceramic coating composition, and wherein the diamond additive comprises diamond particles and specific coloured mica particles, particularly blue and/or green and/or red mica particles.

The term "coating composition" refers to a composition capable of forming a coating. The terms "coating" and "coating layer" may be used interchangeably and refer to a covering that is applied to and bound to at least part of (the surface of) an object or an artefact, also referred to as the substrate. The terms "% by weight" or "wt %" refer to weight percent compared with (i.e. relative to) the total weight.

The improved ceramic coating composition according to the present invention comprises 0.1% to 2% wt of a diamond additive, preferably 0.1% to 1% wt diamond additive, with the wt % being relative to the total weight of the improved ceramic coating composition, which is added to a base ceramic coating composition CCC as further defined herein. The diamond additive as envisaged herein comprises diamond, preferably single crystal diamonds, and specific mica particles, particularly coloured mica as further defined herein.

The diamond additive is preferably added to the base ceramic coating composition as a dry powder. However, it may be added as a suspension of the powder dispersed in one or more solvents present. The one or more solvents may be one or more of those present in the improved ceramic coating composition according to the present invention.

The diamond is present in the diamond additive as particles, particularly as single crystals. The diamond particles may have a size range of 4 μm to 8 μm as measured by using standard techniques and, for instance, a particle size analyser. Preferably, the diamond particles have a particle dispersity (Polydispersity Index or PDI) below 0.3. The diamond particles may be synthetic diamonds or naturally occurring diamonds and may be industrial or otherwise. The diamond may be suitable for regular food contact for cookware applications.

The diamond additive further comprises coloured mica as mica particles. The mica particles may have a size range of 5 μm to 100 μm as measured by using standard techniques and, for instance, a particle size analyser. In the context of the present invention, the diamond additive comprises specific coloured mica particles, in particular blue and/or green and/or red coloured mica particles.

Mica is a generic name for a group of sheet silicate (phyllosilicate) minerals, i.e. with a layered or platy structure, and with a similar molecular formula. Mica has a Mohs hardness of about 2-3. Muscovite is one of the most common mica minerals and is a hydrated phyllosilicate mineral of aluminium and potassium with formula $KAl_2(AlSi_3O_{10})(F, OH)_2$, or $(KF)_2(Al_2O_3)_3(SiO_2)_6(H_2O)$. It typically is colourless or white-grey coloured and can be transparent or translucent. Synthetic micas exist as well (e.g. fluorophlogopite, $KMg_3AlSi_3O_{10}F_2$). Synthetic micas may have superior characteristics compared to natural micas, such as brightness, high purity, a smooth surface, or the absence of deleterious substances, e.g. Hg, Pb, As, etc.

Pigments (i.e. coloured substances) comprising (natural or synthetic) mica coated with titanium dioxide ($TiO_2$) and/or with another metal oxide (e.g. iron oxide or tin oxide) are known in the art. The oxide coating is in the form of a thin film deposited on the surfaces of the mica particle. These pigments produce a reflective colour depending on the thickness of the coating layer.

Accordingly, in particular embodiments, the improved ceramic coating composition of the present invention comprises a base ceramic coating composition and a diamond additive, wherein the diamond additive comprises diamonds and coloured mica particles, wherein the coloured mica particles comprise natural or synthetic mica particles coated with a titanium dioxide ($TiO_2$) and/or with a metal oxide layer (e.g. iron oxide, tin oxide). In particular embodiments, the thickness of the titanium dioxide and/or metal oxide layer is between 80 and 160 nm, preferably between 90 and 150 nm.

In certain embodiments, the diamond additive comprises blue mica particles, made up of natural or synthetic mica particles coated with a titanium dioxide and/or metal oxide layer between 100 and 140 nm.

In certain embodiments, the diamond additive comprises green mica particles, made up of natural or synthetic mica particles coated with a titanium dioxide and/or metal oxide layer between 140 and 160 nm.

In certain embodiments, the diamond additive comprises red mica particles, made up of natural or synthetic mica particles coated with a titanium dioxide and/or metal oxide layer between 80 and 100 nm.

The diamond additive may comprise a mixture of the coloured micas envisaged herein. In addition to the coloured mica, the diamond additive may also comprise other, uncoloured, coated or uncoated types of mica, such as for instance, designated CAS 12001-26-2 (Muscovite). Preferably, the mica is food contact compliant for cookware applications.

The weight ratio of diamond:mica in the diamond additive as envisaged herein is between 1:0.1 or 1:0.5 and 1:3, preferably between 1:1 and 1:3, such as between 1:2 and 1:3.

There may be at least 20 wt % diamond in the diamond additive, more preferably 25 wt %-30 wt %. Accordingly, the improved ceramic coating composition as envisaged herein comprises between 0.02 and 0.65 wt % diamond particles, preferably between 0.1 and 0.5 wt % diamond particles, such as between 0.1 and 0.4 wt % diamond particles, and between 0.05 and 1.5 wt % of mica particles, preferably between 0.1 and 1.0 or between 0.1 and 0.6 wt % of mica particles, with the wt % being relative to the total weight of the improved ceramic coating composition according to the present invention.

The improved non-stick ceramic coating of the present invention has an increased longevity of its non-stick properties, particularly an increased boiling salt water resistance of its non-stick properties. As envisaged herein, the non-stick property or non-stick release performance of a coating, particularly ceramic coating, may be assessed by performing the Cookware Manufacturers Association (CMA) Standard Fried Egg test (CMA Standards Manual (2012), p. 81), which is an adaptation of British Standard (BS) 7069:1988, wherein the egg release is graded as follows:

Grade 5—Excellent non-stick properties: No sticking in centre or edges of egg. Slides easily without pushing with spatula. Leaves no mark or residue.

Grade 4—Good non-stick properties: Slight sticking around edges. Slides easily if moved with spatula. Leaves slight mark, but no residue.

Grade 3—Fair non-stick properties: Moderate sticking on edges, slight sticking in centre. Slides only if steeply tilted and shaken, and must be pushed with spatula. Leaves mark and slight residue.

Grade 2—Poor non-stick properties: Requires considerable effort to free egg, but can be freed intact with spatula. Does not slide. Leaves moderate residue.

Grade 1—Very Poor non-stick properties: Egg cannot be freed from surface without breaking up.

Comparing the non-stick durability of a conventional ceramic coating (composition) or a conventional ceramic coating (composition) comprising diamonds with an improved ceramic coating composition comprising diamond and the specific coloured mica particles as envisaged herein allows assessing the increase in the durability of the non-stick property due to the addition of diamonds and coloured mica to the base ceramic coating composition CCC.

Non-stick ceramic coatings based on the improved ceramic coating composition of the present invention typically have a perfect non-stick performance when new, obtaining a Grade 5 score in the Fried egg test (i.e. perfect release: no egg residues remain on the surface after the egg is released).

As envisaged herein, the durability of the non-stick property of a coating may be measured by determining the number of cycles, consisting of one ENV12785-1:1998 Standard Dishwasher test (1DW)+two temperature shock (260° C.; 10 min, followed by quenching) (2TS)+a salt water boiling step (SW), required to reduce the non-stick property of the coating from Grade 5 to Grade 1, wherein the non-stick property of the coating before and after each cycle is evaluated by performing a Standard CMA Fried Egg test. Advantageously, this analysis method simulates the domestic use. More in particular, the evaluation of the non-stick durability comprises the following steps:
(i) Assess the initial non-stick property or non-stick release performance of the coating (applied on a cookware item) via a Standard CMA Fried Egg Test (5 times) on a scale of Grade 5 (perfect non-stick) to Grade 1 (egg sticks). It is understood the coating should not have any surface defects before the test;
(ii) Perform an ENV12875-1:1998 Standard Dishwasher Test, to remove egg residue;
(iii) Subject the coating to a Temperature Shock (260° C. for 10 mins, then quench) and repeat the Temperature Shock treatment (i.e. 2 temperature shock treatments). The temperature shock treatment includes heating up the interior base centre (of the artefact) to a temperature of 260° C. and maintaining that temperature for 10 minutes. Next, the sample is immediately quenched in tap water at ambient temperature;
(iv) Contact the coating with boiling salt water (0.5% NaCl) for 2 hours;
(v) Assess the non-stick property via CMA Standard Fried Egg Test (2 times);
(vi) Repeat steps (ii) to (v) until the non-stick property is reduced to Grade 1 (egg sticks).

Advantageously, the durability of the non-stick property of the improved ceramic coating of the present invention as assessed by the above 1 DW+2TS+SW procedure is at least 100% or 150% (e.g. 200%) longer than the durability of the non-stick property of a base ceramic coating in the absence of a diamond additive, and is at least 25% or at least 50% longer than the durability of the non-stick property of a base ceramic coating comprising a diamond additive without coloured mica particles.

Advantageously, the improved ceramic coating comprising diamond particles and the coloured mica particles as envisaged herein also exhibit an improved durability of the non-stick performance to salt water (boiling), which may be assessed by performing the CMA Fried Egg test after repeated three hours of 5% salt water boiling. The Salt Water Boiling followed by Fried Egg testing is repeated until the non-stick release Grade becomes 1. The longevity of the non-stick properties is then expressed as the number of hours of salt water boiling required to destroy the non-stick properties. Advantageously, this analysis method simulates the use of a non-stick coating in the preparation of salty food products. More in particular, the evaluation of the non-stick durability or non-stick release performance via the 5% Salt Water Boiling test comprises the following steps:
(i) Assess the initial non-stick property or non-stick release performance of the coating (applied on a cookware artefact) via a Standard CMA Fried Egg Test on a scale of Grade 5 (perfect non-stick) to Grade 1 (egg sticks);
(ii) Fill the cookware artefact with a 5% salt solution to a level more than half-way up the side wall of the artefact;
(iii) Keep the temperature of the solution at boiling for 3 hours;
(iv) Assess the non-stick property via CMA Standard Fried Egg Test (2 times);
(v) Repeat steps (ii) to (iv) until the non-stick property is reduced to Grade 1 (egg sticks).

Advantageously, the durability of the non-stick property of the improved ceramic coating of the present invention against salty solutions or food products, in particular as evaluated by the above 5% Salt Water Boiling test, is at least 400%, at least 500% and even at least 600% or 700% longer than the durability of the non-stick property of a base ceramic coating CCC in the absence of diamonds. In addition, and highly surprisingly, the 5% Salt Water Boiling durability of the non-stick property of the improved ceramic coating of the present invention is at least 300% or at least 400% longer than the durability of the non-stick property of a base ceramic coating comprising a diamond additive without coloured mica particles.

Advantageously, the improved ceramic coating composition of the present invention as envisaged herein also exhibit an improved durability of the non-stick performance to abrasion, which may be assessed by performing the CMA Standard Fried Egg test after a BS7069:1988 Abrasion test (force of 15 N). In particular, the Abrasion-Fried Egg test comprises the following steps:
(i) Assess the initial non-stick property or non-stick release performance of the coating (applied on a cookware artefact) via a Standard CMA Fried Egg Test on a scale of Grade 5 (perfect non-stick) to Grade 1 (egg sticks);
(ii) perform an Abrasion Test on the coating applied on a cookware artefact using a 3M 7447B Scotch-Brite abrasive pad and a force of 15 N (i.e. 1.5 kg) (renew the abrasive pad every 250 cycles);
(iii) Assess the non-stick property via CMA Standard Fried Egg Test (2 times);
(iv) Repeat steps (ii) to (iii) until the non-stick property is reduced to Grade 1 (egg sticks).

Advantageously, the durability of the non-stick property of the improved ceramic coating of the present invention as evaluated by the above Abrasion-Fried Egg test is at least 100% or 150% (e.g. 200%) longer than the durability of the non-stick property of a base ceramic coating in the absence of a diamond additive, and is at least 25%, at least 50% (e.g. at least 100%) longer than the durability of the non-stick property of a base ceramic coating comprising a diamond additive without coloured mica particles.

The improved ceramic coating composition of the present invention comprises a diamond additive as defined herein added to a base ceramic coating composition, which is diamond free. The so-called base ceramic coating composition (CCC) as envisaged herein may be any non-stick ceramic coating composition containing Si or Zr. It may be an inorganic ceramic coating composition or a hybrid ceramic coating composition. It may be a sol-gel ceramic coating composition. It may be a liquid or a gel. The improved ceramic coating composition according to the present application comprises a base ceramic coating to which a diamond additive comprising diamond particles and mica particles has been added. In particular embodiments, the improved ceramic coating composition contains more than 80 wt % CCC, preferably more than 90%, more preferably more than 95% CCC, preferably up to 99.9 wt % of a base ceramic coating composition (CCC). Most preferably, the improved ceramic coating may contain 98 to 99.9 wt % of a base ceramic coating composition, with the diamond additive comprising diamond particles and the coloured mica particles (particularly blue and/or red and/or green) as envisaged herein making up the remainder of the improved ceramic coating. The improved ceramic coating composition is particularly provided as a liquid composition. In particular embodiments, the base ceramic coating composition and the diamond additive do not comprise a silicone oil.

The inorganic CCC may be any which is inorganic, and preferably containing silica, though it may be based on a different metal, such as zirconium (forming zirconia ceramic). Inorganic ceramic coatings are well known in the art and include temperature-resistive coatings, non-stick coatings, as well as the coatings described herein. The term "inorganic" refers to not composed of organic matter. Inorganic compounds are traditionally viewed as being synthesised by the agency of geological systems. In contrast, organic compounds are found in biological systems. Inorganic chemistry deals with molecules lacking carbon. Typically, a non-stick inorganic CCC contains a silane, or an oligomer thereof.

The term "hybrid ceramic coating (composition)" (hybrid CCC) refers to ceramic coatings that are inorganic-organic. Such a coating contains oligomeric or polymeric chains containing both Si and C atoms. A hybrid CCC is known in the art of non-stick coating. A hybrid CCC typically contains silicone type resins (binders) with a relatively high ratio of Si (i.e. inorganic part of the chain) to organic material (i.e. organic part of the chain). Si-atoms may form a part of oligomer chain that comprises a Si atoms backbone with organic linkages between them. These chains may or may not be silanes. An example of a hybrid CCC is a polymer of tetraethoxysilane.

The chain of a hybrid CCC is generally pre-formed by a coating manufacturer. The synthetic chemistry (i.e. synthesis) with a hybrid CCC has generally already been performed by the coating manufacturer. The physical/mechanical properties of these hybrid coatings generally speaking may be somewhere between inorganic ceramic-like and organic-like—e.g. harder and more temperature resistant than a silicone polyester non-stick coating but less hard and less temperature resistant than an inorganic ceramic non-stick coating.

An example of a hybrid ceramic is the hybrid ceramic manufactured by Fruto Chemicals Company Ltd (China) which may be suitable for non-food applications, and which comprises ceramic-silicone resin (CAS no: 67763-03-5, 40-50 wt %); PMA/IPA solvent (CAS no: 108-65-6, 10-20 wt %); titanium dioxide (CAS no: 13463-67-7 20-30 wt %); carbon black (CAS no: 1333-86-4, 8 wt %); Cobalt Oxide (CAS no:1307-96-6; 5-10 wt %); Iron Oxide (Cas no: 1309-38-02; 5-10 wt %); trimethylamine (CAS no: 121-44-8, 0.5-1 wt %); whisker filler (8-15 wt %); mica (CAS no: 12001-26-2, 0.2-1 wt %); surfactants (0.5 wt %).

The base ceramic coating composition CCC as envisaged herein may be a sol-gel type. A sol-gel type of ceramic coating is known in the art, and typically it contains a mixture of binding agent comprising a silane or an oligomer thereof and silica. The sol-gel may be inorganic or hybrid. Generally in a sol-gel, silane monomers oligomerise to form oligo-silanes during a maturing reaction, and subsequently, the oligo-silanes would bond to the oxides at the surfaces of the substrate and then further polymerise during a drying/curing step after application.

According to one embodiment of the invention, the improved ceramic coating composition comprises a diamond additive comprising diamond particles and mica particles as envisaged herein and a sol-gel ceramic coating composition, said sol-gel ceramic coating composition comprising:
 (a) 11-20 wt % of a silane or an oligomer thereof as a binder;
 (b) 19.5-41.5 wt % of a silica mixture;
 (c) 0-19 wt % of a functional filler;
 (d) 2-15 wt % a ceramic powder that emits far infrared radiation and anions; and
 (e) 0-25 wt % pigment that produces colour;
with wt % compared with the total weight of the sol-gel ceramic coating composition.

In a particularly advantageous embodiment, the improved ceramic coating composition comprises a diamond additive comprising diamond particles and mica particles as envisaged herein and a sol-gel ceramic coating composition, said sol-gel ceramic coating composition comprising
 (a) 11-20 wt % of a silane or an oligomer thereof as a binder;
 (b) 19.5-41.5 wt % of a silica mixture;
 (c) 3-19 wt % of a functional filler; such as 3-15 wt % or 10-19 wt % of a functional filler;
 (d) 2-15 wt % a ceramic powder that emits far infrared radiation and anions; and
 (e) 0-25 wt % pigment that produces colour;
with wt % compared with the total weight of the sol-gel ceramic coating composition.

Preferably, the improved ceramic coating composition comprises a diamond additive comprising diamond particles and mica particles as envisaged herein and a sol-gel ceramic coating composition, said sol-gel ceramic coating composition comprising:
 (a) 12-15.3 wt % of a silane or an oligomer thereof as a binder;
 (b) 25-35 wt % of a silica mixture;
 (c) 0-15 wt % of a functional filler, preferably 3-15 wt % of a functional filler;
 (d) 2-5 wt % a ceramic powder that emits far infrared radiation and anions; and
 (e) 5-20 wt % pigment that produces colour;

with wt % compared with the total weight of the sol-gel ceramic coating composition.

Preferably, the improved ceramic coating composition comprises a diamond additive comprising diamond particles and mica particles as envisaged herein and a sol-gel ceramic coating composition, said sol-gel ceramic coating composition comprising:
(a) 12-15.3 wt % of a silane or an oligomer thereof as a binder;
(b) 25-30 wt % of a silica mixture;
(c) 3-6 wt % of a functional filler;
(d) 3-5 wt % a ceramic powder that emits far infrared radiation and anions; and
(e) 15-20 wt % pigment that produces colour;
with wt % compared with the total weight of the sol-gel ceramic coating composition, wherein, preferably, the binder is provided as 32-36 wt % methyltrimethoxysilane (MTMS) in ethanol.

The components of the base sol-gel CCC as envisaged herein are preferably suspended in a solvent such as a mixture of water and an alcohol such as methanol, ethanol or isopropyl alcohol. The different components for use in the methods, compositions and coatings as envisaged herein are further discussed below:

The silane or an oligomer derived thereof as a binder may be a liquid. In certain embodiments, the silane or oligomer thereof as envisaged herein may be an alkoxysilane or an oligomer thereof. The silane or an oligomer derived thereof may be provided in alcohol; the % wt of silane or an oligomer still refers to the wt % of silane or an oligomer derived thereof present in the inorganic ceramic coating composition and not to the wt % of the alcohol solution thereof. The alcohol may be, for instance, methanol, ethanol, or iso-propyl alcohol. The silane or oligomer derived thereof may be present in the alcohol at 20 wt %, 30 wt %, 40 wt %, 50 wt % compared with the total weight of the alcohol solution. It is appreciated that just prior to mixing with the other components of the (base) CCC, the alcohol may contain water.

In certain embodiments, the silane may be at least one compound selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, nornnalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane.

In certain embodiments, the silane or oligomer thereof may be at least one compound selected from the group consisting of methyltrimethoxysilane, ethyltrimethoxysilane, normalpropyltrimethoxysilane, phenyltrimethoxysilane, vinyltrimethoxysilane, methyltriethoxysilane, ethyltriethoxysilane, normalpropyltriethoxysilane, phenylriethoxysilane, vinyltriethoxysilane, trifluoropropyltrimethoxysilane, tridecafluorooctyltrimethoxysilane, tetraethoxysilane, and heptadecafluorodecyltrimethoxysilane, or an oligomer thereof.

Preferably, the silane or oligomer thereof does not comprise fluorine atoms.

In certain embodiments, the silane or oligomer thereof may be methyltrimethoxysilane (MTMS) or an oligomer thereof. The silane or oligomer thereof may be 32-36 wt %, preferably as 34 wt % methyltrimethoxysilane (MTMS) in ethanol.

In certain embodiments, the silane may have a formula $R_nSiX_{4-n}$ or an oligomer thereof, wherein
each X is the same or different, and is selected from a hydrolysable group or a hydroxyl group,
R is the same or different, and is selected from hydrogen or an alkyl group having less than 10 carbon atoms, and
n is 0, 1, or 2.

In certain embodiments, the hydrolysable groups may be an alkoxy moiety such as methoxy or ethoxy. Such methoxy or ethoxy groups advantageously react with the various forms of hydroxyl groups.

As used herein, the term "alkyl group" refers to a hydrocarbon group of Formula $C_pH_{2p+1}$ wherein p is a number of at least 1. Alkyl groups may be linear, or branched and may be substituted as indicated herein.

The alkyl groups may comprise from 1 to 10 carbon atoms, preferably from 1 to 6 carbon atoms, more preferably 1, 2, 3, 4, 5, 6 carbon atoms. When a subscript is used herein following a carbon atom, the subscript refers to the number of carbon atoms that the named group may contain. For example, the term "alkyl group having less than 10 carbon atoms", as a group or part of a group, refers to a hydrocarbon group of Formula $C_pH_{2n+1}$ wherein p is a number ranging from 1 to 10. For example, an alkyl group having less than 10 carbon atoms includes all linear, or branched alkyl groups having 1 to 10 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, and decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, henicosyl and its isomers, docosyl and its isomers, tricosyl and its isomers, tetracosyl and its isomers, pentacosyl and its isomers, and the like.

If the content of the binder is out of the above-specified range, delamination of a coating layer formed by the improved ceramic coating composition as taught herein can occur.

In certain embodiments of the base sol-gel ceramic coating composition as envisaged herein, the silica mixture is bound to the silane or to the oligomer thereof by a chemical reaction. Typically it binds as the inorganic ceramic coating composition CCC starts to mature.

The silica mixture chemically binds the silane or oligomer derived thereof as binding agent. In certain embodiments of the sol-gel CCC as envisaged herein, the silica mixture contains 20-40 wt % of silicon dioxide ($SiO_2$) as a powder or colloid. The remainder of the silica mixture may comprise water, optionally combined with an alcohol, such as methanol, ethanol or isopropyl alcohol. The $SiO_2$ preferably has a particle size of 0.2-1.0 μm. The $SiO_2$ preferably contains 60-80 wt % of water, with wt % compared with the total weight of the silica mixture. If the particle size and content of the silica mixture are out of the above-specified ranges, the silica mixture may not sufficiently react with the binder silane or oligomer thereof.

The sol-gel CCC as envisaged herein preferably contains a functional filler. The functional filler may be a powder. The functional filler as defined herein may be potassium titanate, alumina or the like, but should be free of mica particles. The functional filler as defined herein may be composed of needle-shaped or sheet-shaped particles. The mean particle size may be 5 μm, 10 μm, 20 μm, 25 μm, or a value in a range between any two of the aforementioned values, preferably between 5 µm and 20 µm, preferably equal to or less than 20 µm. The functional filler as defined herein functions to prevent cracking between the binder and the silica mixture in a coating layer formed of the inorganic ceramic coating composition as taught herein and/or to control the viscosity of the inorganic ceramic coating composition as taught herein. If the content of the functional filler as defined herein is more than 19 wt %, the surface of the coating layer will become rough.

In certain embodiments, the functional filler as envisaged herein may comprise at least one natural mineral material selected from the group consisting of quartz, monzonite, gneiss and rhyolitic tuff.

The sol-gel CCC as envisaged herein preferably comprises a ceramic powder emitting far infrared radiation and anions. The mean particle size of the ceramic powder may be 2 µm, 4 µm, 6 µm, 8 µm, or 10 µm, or a value in a range between any two of the aforementioned values, preferably equal to or less than 10 µm.

The ceramic powder emits far-infrared (IR) radiation together with anions. The ceramic powder may comprise a material that emits both far IR rays and anions, or a mixture of materials that separately emit far IR radiation and anions. In particular embodiments of the sol-gel CCC, the ceramic powder comprises a far infrared radiation emitting material and an anion-emitting material.

The far-infrared radiation-emitting material may be a ceramic material comprising at least one selected from a group of natural mineral materials (tourmaline, loess, sericite, amethyst, raw ore, bamboo charcoal, Uiwangseok (natural ore), obsidian and elvan) which show a far-infrared emissivity of 90% or higher at a temperature of 40° C. The anion emitting material may comprise at least one element selected from the group of strontium, vanadium, zirconium, cerium, neodymium, lanthanum, barium, rubidium, caesium and gallium. In certain embodiments of the CCC as taught herein, the far-infrared radiation emitting material and the anion-emitting material may be mixed at a weight ratio of 1:1.

The far-infrared radiation-emitting material as defined herein may be any ceramic material which shows a far-infrared emission rate of 90% or higher, at a temperature of 40° C. Far-infrared emissions have a wavelength of 15 µm to 1 mm. Far-infrared emissions may be tested using KICM-FIR-1005 (based on JIS-R-1801) by using FT-IR. In certain embodiments, the far-infrared radiation emitting material may comprise at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, and lava. It is noted that most natural ceramic mineral materials also emit anions.

The anion-emitting material as defined herein may be any material which emits an anion. The presence of anion emissions may be tested using JIS-B-9929.

In certain embodiments, the anion-emitting material may be an element. The element comprises at least one element selected from the group consisting of strontium, vanadium, zirconium, cerium, neodymium, lanthanum, barium, rubidium, caesium, and gallium. Such anion-emitting materials are known to emit anions and far-infrared rays. The far-infrared radiation-emitting material and the anion-emitting material may be mixed at a weight ratio of 1:1, wherein the far-infrared radiation-emitting material may comprise at least one natural ore material selected from the group consisting of tourmaline, loess, sericite, amethyst, raw ore, bamboo charcoal, Uiwangseok (natural ore), obsidian, elvan, yellow ocher, Sanggwangsuk, kiyoseki, Kwangmyeongsuk, Kwisinsuk and lava; and the anion-emitting material may comprise at least one element selected from the group consisting of strontium, vanadium, zirconium, cerium, neodymium, lanthanum, barium, rubidium, caesium, and gallium.

The pigment that produces colour may be any pigment used in the field of ceramic coatings. Preferably, where the composition according to the present invention is used as a base coat layer, the pigments might include for example Titanium Dioxide (CAS No 13463-67-7) and/or Copper Chromite Black Spinel (CAS No 68186-91-4) or other inorganic pigments that contain no toxic heavy metals.

A ceramic coating containing the improved ceramic coating may be a single layer coating or a multilayer coating, comprising a base coating and one or more other coating layers. A base coating may be used in combination with other coatings such as intermediate and top coating. The base coating is disposed closest to the artefact substrate surface.

The base coating may be a ceramic coating. In one embodiment, the base coating does not contain the diamond additive as envisaged herein, such as containing a base ceramic coating composition as envisaged herein. In another embodiment, the base coating may be an improved ceramic coating according to the present invention. The base coating may contain pigment that produces colour and provide opacity for covering the underlying substrate.

The base coating may be specifically formulated to be compatible with an improved ceramic coating according to the present invention and its diamond additive as a top coat, which is within the activities of the skilled person.

The artefact, in particular the cookware item may be coated with at least one layer of the improved ceramic coating composition comprising diamond and the coloured mica particles (particularly, blue and/or green and/or red) according to the present invention. The artefact, in particular the cookware item, may be coated with multiple layers of the improved ceramic coating composition according to the present invention. For example, the artefact, in particular the cookware item, may be coated with two or more, three or more, or four or more layers of the improved ceramic coating composition according to the present invention.

The improved ceramic coating composition according to the present invention may be applied as a base, top, or intermediate coating for the artefact. Preferably, it is provided as a top coating over a base coating.

In a preferred embodiment, the artefact is provided with a dry (cured) film comprising one base coating and one improved ceramic coating according to the present invention over the base coating. In a preferred embodiment, the artefact is provided with a dry film comprising one base coat (which can also be improved ceramic coating according to the present invention) and one improved ceramic coating according to the present invention applied over the base coating, wherein the improved ceramic coating according to the present invention coating is 14-50 wt %, preferably 25-35 wt %, more preferably around 30 wt % of the total cured coating.

In a preferred embodiment, the artefact with a dry film comprising one base coating (which may be an improved ceramic coating according to the present invention) and one improved ceramic coating according to the present invention coating applied over the base coating wherein the improved ceramic coating according to the present invention is 4-50%, preferably 25-35%, more preferably around 30% of the height of the total cured coating. A top coat made up of the improved ceramic coating according to the present invention may provide a clear or translucent layer, whereas the base coating may provide colour and opacity for covering the underlying substrate.

In certain embodiments, the present invention relates to an improved ceramic coating according to the present invention applied to and bound to (the surface of) an artefact, wherein the improved ceramic coating according to the present invention is prepared from the improved ceramic coating composition according to the present invention, typically by a curing step.

The artefact may be any article that is amendable to receiving a ceramic coating. In particular, the artefact is anything where providing a non-stick property on at least part thereof is advantageous. The artefact may be cookware or bakeware for the oven or stove-top or it may be the cooking surface of a small electrical appliance. For instance, the artefact may be a frying pan, a skillet, a sauce pan, a crepe pan, an egg pan, a milk pan, a casserole dish, a stock pot and the like. For instance, the artefact may be a cake tins, a muffin tin, a bread tin, a pizza tray, a roasting tin, a Dutch Oven and the like. The artefact may also be a metal cutlery item such as a knife or other utensil where a hard, scratch-resistant surface combined with low friction and easy cleaning is advantageous. The artefact may be an electrical appliance such as a barbeque grill, a multi-cooker, an electric pressure cooker, a rice cooker, a waffle maker, a sandwich toaster, a hair care product such as a hair straightener or a curling iron, water heating element, and the like. Equally, it could be an oven cavity. Equally, the artefact may be anything where a non-stick property is not a requirement, such as in a wood-burning-stove, heating boiler, heater in general. The artefact may be provided in a health aid (e.g. implant, surgical tool), building material or industrial products or processing equipment such as moulds, conveyor belts, heat exchanger surface, or other surfaces where easy cleaning, food release, low fraction or corrosion resistance is a requirement.

Where the coating of an artefact is described herein, it is understood that at least part of the artefact is coated. It does not mean that the whole artefact is coated, however, it may be an-over coating or may only cover parts of the artefact. For instance, the improved ceramic coating composition according to the present invention may be applied to the interior surface, the exterior surface, and/or the handle of the cookware. Generally speaking, it is understood that the artefact is provided with a substrate onto which the improved ceramic coating or the improved ceramic coating composition according to the present invention is disposed. For instance, where the artefact is a hair straightener, the substrate is typically a pair of electrically-heated aluminium co-operating surfaces. The substrate of the artefact may be any amendable to receiving the improved ceramic coating or the improved ceramic coating composition according to the present invention, and may be metallic or polymeric.

The substrate may be aluminium (i.e. metallic or alloy), hard anodized aluminium, stainless steel, copper, cast iron, enamelled cast iron, carbon steel, enamelled carbon steel, or any other metal or combination of metals (e.g. clad materials such as bi-ply, tri-ply, 5-ply, etc) that is used in an artefact. The substrate may be polymeric, such as a high-temperature resistance polymer or the substrate may be another ceramic material such as glazed or unglazed porcelain ceramic, or it may be glass.

Some parameters of the dry (cured) coating or film according to the present invention are detailed below:

The thickness of the dry (cured) film provided on an artefact and containing the ceramic coating comprising the diamond additive according to the present invention is suited to its application. The thickness of the dry film containing the improved ceramic coating according to the present invention and any other coatings (e.g. base coating) may be 20-60 µm. The thickness of the improved ceramic coating component in the dry film provided on an artefact may be 5-50 µm, preferably 5-20 µm.

Other parameters characterising the dry (cured) film containing the improved ceramic coating according to the present invention as a top coat include one or more of the following:

Cross Hatch Adhesion (CMA 21.6.1/BS7069)—Pass (No Coating Removed);

Pencil Hardness (EN 12983-1:1999) greater than 9H, preferably greater than or equal to 10H at room temperature and at 200 deg C. (Pencil Hardness of 9H translates into a value of >1 GPa (Giga Pascal) or >100 Vickers.

Elastic Modulus of 8-10 GPa;

Scratch Resistance of 10 to 15 N (by BS7069);

Abrasion Resistance of 20,000 to 90,000 cycles (BS7069 adapted to employ a 45 N force instead of the specified 15 N);

Water Contact Angle of 105 deg to 108 deg measured according to the Cookware Manufacturers Association Standards Manual (2012) p 76-77;

Thermal Conductivity of 2.2 to 2.8 $W \cdot m^{-1} K^{-1}$, preferably 2.4 to 2.6 $W \cdot m^{-1} K^{-1}$ measured according to ASTM E-1461;

Far Infrared Emissivity, epsilon of 0.92 to 0.93 measured according to KICM-FIR-1005:2006;

Dry Film Density of 2.0 $g/cm^3$ (typical for top coat) to 2.5 $g/cm^3$ (typical for base coat)—naturally, the combined base and top coat will have an average density somewhere between these two numbers;

Dry Film Elemental Composition, measured by SEM-EDX typically of Carbon (C) (13-14 wt %), Oxygen (O) (37-38 wt %), Silicon (Si) (32-33 wt %), Titanium (Ti) (3.9-4.0 wt %), Aluminium (Al) (4.4-4.5 wt %).

The improved ceramic coating composition according to the present invention may be applied by using various coating methods known in the art such as spray coating, roller coating, curtain coating or dip coating.

Accordingly, in another aspect, the present invention relates to a method for coating an artefact or substrate, in particular an item of cookware with an ECC as taught herein.

The artefact or substrate may be coated by a method comprising the steps:
  pre-treating the artefact or substrate, in particular the surface thereof, by washing/degreasing,
  roughening the surface of the artefact or substrate, such as by sand or grit blasting or etching (acid or alkali),
  applying the improved ceramic coating composition according to the present invention as a base coating layer or as a subsequent coating layer, preferably by using a spray gun or an air-assisted spray gun,
  curing the coating(s).

The step of spraying the improved ceramic composition as taught herein may be performed manually, semi-automatically, automatically or robotically.

A further embodiment of the invention is a method for coating an artefact or substrate surface comprising the steps:
A) roughening of the surface of the artefact or substrate,
B) applying a base coat layer of a ceramic coating composition to the substrate,
C) applying a top coat layer of the improved ceramic coating composition as described herein over the wet base coat, and
D) curing the combined base coat and top coat to obtain a dry film.

The base coat layer may be an improved ceramic coating composition as described herein, or any another ceramic coating composition.

Where the improved ceramic coating composition of the present invention is applied as a subsequent coating, for instance, over a base coating, it may be applied over the wet base coat. The curing step is applied to both the base coating and the improved ceramic coating composition of the present invention.

Where the base ceramic coating composition as envisaged herein is a sol-gel coating, the present invention provides a method for coating an artefact or substrate comprising the steps of:
providing a first solution comprising a silica mixture, a functional filler, and, preferably, a ceramic powder that emits far-infrared ray-radiation and anions in a first container;
providing a second solution comprising silane or an oligomer thereof as a binder in a second container;
pre-agitating the first solution in the first container and the second solution in the second container;
mixing the first solution and the second solution, thereby obtaining a base sol-gel ceramic coating composition CCC;
agitating the CCC;
maturing the CCC;
adding the diamond additive comprising diamonds and mica particles to the sol-gel CCC thereby obtaining the improved ceramic coating composition of the present invention;
filtering the improved ceramic coating composition of the present invention;
applying the improved ceramic coating composition of the present invention onto the artefact or substrate as a base coating or a further coating, preferably as a top coating; and
curing the improved ceramic coating composition of the present invention, thereby obtaining an artefact coated with a film containing the improved ceramic coating of the present invention.

The term "maturing", as used herein, refers to bringing the chemical reactions (e.g. acid catalysed silane oligomer formation, reaction between the silica mixture and the silane or oligomer derived thereof) in the (sol-gel) ceramic coating composition CCC to completion.

The term "curing", as used herein, refers to heating the ceramic coating composition (comprising diamonds and mica) applied to the artefact, to solidify the coating and bind it to the artefact. After curing, the adhesion of the improved ceramic coating as taught herein to the artefact surface, for instance a cookware, is mainly mechanical although there may be some chemical bonding involved.

The quantities of components in the first and second solution are such that the first and second solutions when mixed form a base ceramic coating composition CCC as described herein. The quantities of diamond additive as described herein added to the CCC are such that the CCC and diamond additive when mixed form the improved ceramic coating composition of the present invention.

An acid (e.g. hydrochloric acid; formic acid; sulfuric acid; acetic acid; nitric acid), in a catalytic amount (less than 1 wt % of the ceramic coating composition) may be additionally provided in the first and/or second solutions or added separately.

The improved ceramic coating composition of the present invention may be provided as a first solution comprising a silica mixture, a functional filler, and, preferably, a ceramic powder that emits far-infrared ray-radiation and anions; a second solution comprising a silane or an oligomer thereof as a binder; and diamond additive comprising diamond particles and mica particles as described herein.

Prior to the step of pre-agitating the first solution and the second solution, the coating method as envisaged herein may comprise checking whether any deposits adhere to the base of the container comprising the first solution and/or the container comprising the second solution. Any such deposits may be broken down and evenly suspended in the solution before mixing.

If deposits adhere to the inside of the container, the base may be tapped with a rubber or wooden mallet and then the container shaken vigorously. This may be repeated until the deposits are fully dispersed and are no longer visible.

The step of pre-agitating the first solution and the second solution may be performed by rolling the first and second solutions in separate containers on a roller for at least 60 min. The rolling may be performed at a speed of 80-100 rpm (relative to the circumference of the container) and temperature of 20-30° C. The step of pre-agitating may equally be performed using a stirrer.

The step of mixing the first solution and the second solution may be performed by adding the second solution to the first solution. The improved ceramic coating composition of the present invention may contain 30-50 wt % (e.g. 35 wt %) of the second solution, 70-50 wt % (e.g. 65 wt %) of the first solution, and 0.5-2 wt % diamond additive depending on the concentration of components in the respective solutions.

The step of agitating the CCC composition as described herein should be performed immediately after mixing the first solution and the second solution; the agitation is generally vigorous shaking. The step of maturing the CCC as taught herein may be performed without any delay after the step of agitating the CCC as taught herein. This allows obtaining a high quality coating.

There may be some variations in the maturing conditions (e.g. maturing time and temperature of mixing).

The step of maturing the CCC as taught herein may be performed by agitating the CCC, for instance by rolling the CCC at a speed of 80-100 rpm (relative to the circumference of the container), at an air temperature of 40±2° C. Ultrasonic mixing may also be used in conjunction with agitation to augment the mixing efficiency and thus promote the maturation reaction.

Maturing times may be about 3 hours but may vary according to the conditions such as temperature in the working environment.

Alternatively, the step of maturing the CCC as taught herein may be performed by agitating the CCC, for instance by rolling the CCC as taught herein for 24 hours at room temperature.

The step of maturing the CCC as taught herein may be checked by a maturity check. For instance, to check whether the CCC is sufficiently matured, the coating may be sprayed onto a plate, for example a sandblasted aluminium plate, and then baked, for example for 10 minutes at 60-80° C. Good appearance and gloss levels (i.e. when compared with a control standard) may indicate that maturing is complete. Alternatively, if craters are seen in the coating, or there appears to be insufficient gloss, maturing may not be sufficient. If the coating is found to be under-matured (i.e. low gloss and/or craters) then the container with the CCC as taught herein may need to be returned to the rollers for a further period of 30 minutes at a speed of 80-100 rpm.

The step of adding the diamond additive as described herein to the CCC is performed as oligomerisation (maturing) is essentially complete. The diamond additive may be added to the CCC between 1.5 to 2.5 hours after initiation of maturing, preferably after 2 hours after initiation of maturing. After adding the diamond additive as described herein to the CCC, the mixture may be agitated to facilitate mixing, for instance, by rolling. Ultrasonic mixing may also be used in conjunction with agitation to augment the mixing efficiency and thus promote the maturation reaction.

The step of filtering the improved ceramic coating composition of the present invention is important to prevent clogging of the spray gun(s) and for a smooth finish. The step of filtering the improved ceramic coating composition of the present invention may be performed with a filter mesh size of 300 to 400.

The step of spraying the improved ceramic coating composition of the present invention may be performed by using a spray gun such as an air-assisted spray gun. The nozzle diameter may be 1.0 to 1.3 mm. The air pressure may be 2 to 6 bar, depending on the spray gun type. The artefact surface temperature may be 45±10° C., as measured by using a contact thermometer.

The step of spraying the improved ceramic coating composition of the present invention may be performed in a coating booth, preferably at a temperature of 20-30° C. and with a relative humidity of less than 70%. In certain embodiments, spraying may be performed manually, semi-automatically or automatically.

As mentioned earlier, adhesion to the artefact substrate surface, preferably metal surface, may be promoted by grit-blasting the surface, preferably a metal surface, to create a rough profile of peaks and troughs (i.e., an anchor pattern). The momentum of the atomised coating from the spray gun(s) creates flow at the surface, preferably metal surface, thus causing coating to flow into the rough profile.

The artefact substrate surface may be pre-treated before applying the improved ceramic coating composition of the present invention or before applying any base coating. Pre-treatment of the artefact substrate surface before applying a coating may involve degreasing the artefact substrate surface, preferably by solvent, alkali wash. Optionally degreasing includes a step of high temperature exposure to burn off organic material. Such a step may be performed prior to or after a roughening step, but preferably before. Pre-treatment of the artefact substrate surface before the coating step may involve a roughening step. Roughening of the surface may be achieved by sand or grit blasting or etching (acid or alkali). Where sand blasting is used, alumina shot, for example, may be employed. The particle size may be 60 to 80 mesh. The blasting pressure may be 5 to 7 bar. The depth of blast layer (Ra value) may be 2.5 to 3.5 μm (for an aluminum substrate), or 2.5 to 3.0 μm (for an SUS stainless steel artefact surface).

Pre-treatment of the artefact substrate surface before the coating step may involve cleaning the artefact surface for instance by blasting with clean/dry air, preferably at a pressure of 5 to 7 bar, to remove dust and particles.

Pre-treatment of the artefact substrate surface before the coating step may optionally involve hard anodization of the artefact surface.

Pre-treatment of the artefact substrate surface before the coating step may involve dehumidifying of the artefact surface, for instance by pre-heating to peak temperature 60-70° C. immediately prior to spraying.

The step of curing the improved ceramic coating composition of the present invention may be performed at a temperature of at least 180° C. The step of curing the improved ceramic coating composition of the present invention may be performed at a temperature of 280-320° C. for 7 to 10 min. Longer curing times and/or higher temperatures allow a denser coating layer to be achieved. During curing, a fuller or complete polymeric structure is formed.

In certain embodiments, once the improved ceramic coating composition of the present invention has been applied to the artefact, the coating composition is cured, for instance at a peak metal part temperature, e.g. around 300° C. This causes the ceramic coating to solidify and be locked into the anchor pattern. In other words, the adhesion of the improved ceramic coating composition of the present invention to the artefact substrate surface, for instance a cookware, is mainly mechanical although there may be some weak chemical bonding of the silicon atoms (in the silane or oligomer thereof) to the artefact surface, for instance to the metal oxide layer of the artefact surface.

A further aspect relates to a kit for preparing an improved ceramic coating composition of the present invention comprising: (a) a first solution comprising a silica mixture, a functional filler, and preferably, a ceramic powder that emits far-infrared ray-radiation and anions, in a first container; (b) a second solution comprising a silane or an oligomer thereof as a binder; (c) diamond additive as described herein provided in a third container, or wherein the diamond particles and mica particles are provided in separate containers. The first and second solutions, when mixed, provide the base ceramic coating composition CCC. The diamond additive when added to the CCC, provides the improved ceramic coating composition of the present invention, containing diamond additive in a quantity of 0.5 to 2 wt %.

In certain embodiments, acid catalyst may be added in catalytic amounts to the first and/or second solution of the kit, or may be provided as a catalytic solution. The acid catalyst catalyses oligomerisation of the silane. The amount of catalytic acid present in first and/or second solution, or optional catalytic solution of the kit is such that it is less than 1 wt % in the CCC i.e. when the solutions are mixed, wt % is compared with the total weight of the CCC.

A further aspect of the present invention relates to a method for improving the non-stick durability of a ceramic coating comprising adding 0.2 wt %-2 wt % diamond additive to a ceramic coating composition (CCC), preferably a sol-gel ceramic coating composition, thus obtaining the improved ceramic coating composition of the present invention, with wt % compared to the total weight of the ECC composition, wherein said diamond additive comprises diamond and mica particles as defined herein.

A further aspect relates to the use of the improved ceramic coating composition of the present invention for coating an artefact, in particular an item of cookware, ovenware or a knife or other cutlery item or kitchen utensil.

A further aspect relates to an artefact, in particular an item of cookware, ovenware or a knife or other cutlery item or kitchen utensil, coated with the improved ceramic coating of the present invention. The artefact may be disposed with a dry (cured) film containing the improved ceramic coating composition of the present invention as a top coat.

The terms "cookware" may be used interchangeably herein and refer to a kitchen utensil made of material used for cooking. Preferably, the cookware item is a cooking vessel. The term "cooking vessel" refers to any food preparation vessel made of a heat-resistant material. In certain embodiments, the cookware, in particular the cooking vessel, may be a pan such as a frying pan or skillet. In certain embodiments, the cookware, in particular the cooking vessel, may be a pot.

In certain embodiments, the cookware item may be overall coated with the improved ceramic coating composition of the present invention, i.e., the ceramic coating as described herein may completely cover the cookware item. In certain embodiments, parts of the cookware item may be coated with the improved ceramic coating composition of the present invention. In certain embodiments, the interior surface, the exterior surface, and/or the handle and/or lid of the cookware item may be coated with the improved ceramic coating composition of the present invention.

In certain embodiments, the interior surface of the cookware item may be coated with the improved ceramic coating composition of the present invention. In certain embodiments, the interior surface and the exterior surface of the cookware item may be coated with the ECC as taught herein. In certain embodiments, the interior surface, the exterior surface, and the handle of the cookware item may be coated with the improved ceramic coating composition comprising diamonds and mica particles as envisaged herein. In certain embodiments, the interior surface and the handle of the cookware item may be coated with the improved ceramic coating composition according to the present invention.

In certain embodiments, the substrate or artefact, in particular the cookware item may comprise the improved ceramic coating as taught herein and an additional coating. For instance, the artefact, in particular the cookware item may be coated with a non-stick coating. In certain embodiments, the artefact, in particular the cookware item may be coated with an inorganic ceramic coating. For instance, the artefact, in particular the cookware item may be coated with a non-stick inorganic ceramic coating.

In a certain embodiment, the artefact, in particular the cookware item may be coated with one layer of the improved ceramic coating comprising diamond particles and coloured mica particles as taught herein. In certain embodiment, the artefact, in particular the cookware item may be coated with multiple layers of the improved ceramic coating comprising diamond particles and coloured mica particles as taught herein. For example, the artefact, in particular the cookware item may be coated with two or more, three or more, or four or more layers of the improved ceramic coating comprising diamond particles and coloured mica particles as taught herein.

Another aspect of the present invention relates to a method for improving the hot salt resistance, in particular the salt water boiling resistance of the non-stick performance of a non-stick ceramic coating comprising adding 0.2 wt %-2 wt % of diamond additive as envisaged herein to a ceramic coating composition CCC, with wt % compared to the total weight of the ceramic coating composition, wherein said diamond additive comprises diamond particles and specifically colour mica particles, in particular blue and/or green and/or red particles.

The present invention is further illustrated by the following non-limiting examples.

EXAMPLES

Example 1

An aluminium substrate surface of an artefact is roughened by sandblasting to increase the surface area to which aluminium oxide to be subsequently deposited is firmly adhered. After roughening, a washing and drying step is carried out to remove contaminants due to sand blasting. After said washing and drying step, an anodisation step is carried out to form a protective aluminium oxide film layer having enhanced anti-corrosive and anti-abrasive properties. After anodisation, a step of applying a ceramic coating composition is carried out, wherein said ceramic composition comprises a mixture of a base, conventional ceramic coating composition (CCC) and diamond additive (DA), comprising diamond particles and coloured mica particles, specifically blue and/or green and/or red mica particles.

The CCC comprises in admix 40-50 wt % of a binding agent, which is 34 wt % silane or an oligomer derived therefrom in ethanol, as a binder; 27-34 wt % of a silica mixture which chemically binds said silane or an oligomer derived therefrom as a binding agent and contains a mixture of 20-40 wt % of powdered silicon oxide having the particle size of 0.1-1.2 m and 60-80 wt % of water; 3-19 or 0-19 wt % of powdered functional filler which prevents the crack of a film between said binding agent and said silicon mixture and controls the viscosity such that the physico-chemical properties of the film are improved, said filler being comprised of one or more of natural stone material selected from the group consisting of quartz, monzonite, gneiss and rhyolitic tuff; 5-15 wt % of ceramic powder that emits far infrared ray-emitting and anions. The far infrared ray-emitting material comprises one or more selected from a group of natural mineral materials such as tourmaline, yellow ocher, sericite, amethyst, Sanggwangsuk, bamboo charcoal, Uiwangsuk, kiyoseki, obsidian, elvan, Kwangmyeongsuk, lava, Kwisinsuk, and said anion-emitting material is one rare-earth natural stone material selected from strontium, vanadium, zirconium, cerium, neodymium, lanthanum, barium, rubidium, caesium and gallium; 1-25 wt % of pigment which produces colour. The wt % is in relation to the total weight of CCC. The mixture is allowed to mature for 2 hours, after which diamond additive—comprising diamond particles and coloured mica particles—is added 0.2 wt %-2 wt % to form the ceramic coating composition according to the present invention, the wt % is in relation to the total weight of the ceramic coating composition of the present invention. In particular, the coloured mica particles comprised blue and/or green and/or red mica particles. After said step of applying the ceramic coating composition of the present invention is completed, a step of drying at 260-320° C. for 7-10 minutes is carried out to form a dry film coated onto the artefact. The coated artefact has the combined advantages of durable non-stick, scratch and abrasion resistance.

In addition, the artefact coated with the coloured (blue) mica comprising diamond additive was found to have an enhanced thermal conductivity (ca 10.5× as thermally conductive as a 3-layer PTFE coated artefact), resulting in a faster heating up of the surface of the artefact (e.g. a cooking surface of a cooking pan).

Example 2

A stainless steel substrate surface of an artefact is roughened by sandblasting to increase the surface area for the application of further layers. After roughening, a washing and drying step is carried out to remove contaminants due to sand blasting. After said washing and drying step, a step of applying a ceramic coating composition according to the present invention is carried out. The ceramic coating composition comprises a mixture of a base ceramic coating composition (CCC) and a diamond additive (DA) as described in Example 1. After said step of applying the ceramic coating composition according to the present invention is completed, a step of drying at 280-320° C. for 7-10 minutes is carried out to form a dry film coated onto the artefact. The coated artefact has the combined advantages of non-stick, scratch resistance and abrasion resistance, and enhanced thermal conductivity.

Example 3

In this example, the coating characteristics of a coating according to the present invention, in particular comprising diamond particles and blue coloured mica particles, is compared to the corresponding base ceramic coating composition, which does not comprise the diamond additive.

Sample 1 corresponds to the base ceramic coating composition CCC. Based on the total weight of CCC, Sample 1 consists of 42.5 wt % of a solution containing 34% wt methyltrimethoxysilane (MTMS) as a binder in ethanol; 25.5 wt % of a silica mixture consisting of 40 wt % of silicon dioxide powder (SiO2) having a particle size of 0.2 μm and 60 wt % of water; 4.25 wt % of quartz as a functional filler; 4.25 wt % of ceramic powder consisting of a 1:1 mixture of the far-infrared ray-radiating material tourmaline and the anion-emitting material vanadium; and 15% black pigment that is copper chromite black spinel, the balance containing ethanol. The sample 1 composition is then matured, and referred to as CCC.

In sample 2, 1 wt % DA (diamond:mica weight ratio 1:2.5; with mica comprising non-coloured mica—as in WO2016188946) (based on the total weight of the ceramic coating composition of the present invention) is added to a portion of the Sample 1 CCC, two hours after initiation of maturing of Sample 1, thereby obtaining Sample 2.

To prepare a ceramic coating of the invention, 1 wt % DA (diamond:mica weight ratio 1:2; with mica comprising blue mica particles) (based on the total weight of the ceramic coating composition of the present invention) is added to a portion of the Sample 1 CCC, two hours after initiation of maturing of Sample 1, thereby obtaining Sample 3.

Samples 1, 2 and 3 respectively are coated as a top coat onto separate samples of artefact (Aluminium alloy 3003) and cured. The samples are tested for:

abrasion resistance measured according to (using a force of 45 N);

scratch resistance measured according to BS7069;

water contact angle measured according to the Cookware Manufacturers Association (CMA) Standards Manual (2012) p 76-77;

non-stick durability (in house test designed to simulate domestic use—based on the CMA fried egg test performed before and after a standard dishwasher, two temperature shock and one salt water boiling step (referred to as 1DW+2TS+SW) cycles as described above);

thermal conductivity measured according to ASTM E-1461; and pencil hardness measured according to EN 12983-1:1999.

The ranges of the results are presented in Table 1 below.

TABLE 1

Ranges of results for a coating of invention versus a coating without DA.

| Property | Sample 1 Coating without DA (Comparative ex.) | Sample 2 Coating with DA, as in WO2016188946 (Comparative ex.) | Sample 3 Coating with DA comprising blue mica |
|---|---|---|---|
| Abrasion Resistance (BS7069; 45 N force) | 12,000-20,000 cycles | 20,000-90,000 cycles | 20,000-90,000 cycles |
| Scratch Resistance (BS7069) | 8N | 13N | 13N |
| Water Contact Angle (CMA Standards Manual (2012) p76-77) | 102-106° | 105-110° | 107-110° |
| Non-stick Durability (in house test - 1DW + 2TS + SW) | | Up to +200% vs Sample 1 | Up to +50% vs Sample 2 |
| Thermal Conductivity ($W \cdot m^{-1}K^{-1}$) | 2.0-2.4 | 2.4-2.6 | 2.4-2.8 |
| Pencil Hardness (EN 12983-1:1999) at room temperature and at 200° C. | ≥9 H | ≥10 H | ≥10 H |

Sample 3 according to the present invention shows improvements in abrasion resistance, scratch resistance, non-stick durability, thermal conductivity and pencil hardness compared to the ceramic coating without a diamond additive. In addition, the coating according to the present invention showed a surprising increase in non-stick durability (as assessed via the 1DW+2TS+SW procedure) compared to a ceramic coating comprising a diamond additive without coloured mica particles.

Example 4

The non-stick performance and durability of ceramic coatings according to present invention were compared to prior art non-stick ceramic coatings. The following coatings have been evaluated:

Sample "D+CM"—coating based on the ceramic coating composition as in Example 1, comprising a diamond additive, comprising Diamond particles and blue Coloured Mica, and based on a Thermolon™ CCC Sample "DA"—coating based on the ceramic coating composition of WO2016188946, example 1, comprising a Diamond Additive, comprising Diamond particles and non-coloured mica particles, and based on a Thermolon™ CCC;

commercially available Thermolon™ non-stick ceramic coatings, particularly the Thermolon™ Marathon and Endurance2 coatings ("Marathon" and "Endurance2", respectively), and Thermolon non-stick ceramic coating ("Thermolon NS") available on the market today.

The non-stick durability was assessed by (i) the 1D+2TS+SW test (as in Example 4), (ii) the 5% NaCl boiling test (i.e. based on hours boiling with 5% NaCl followed by the CMA Fried Egg Test) and (iii) the Abrasion Fried Egg test (i.e. performing the CMA Fried Egg Test after the BS7069 Abrasion—15 N force). The results are presented in Table 2 and Table 3 (with in Table 3 expressed, as a percentage of the values obtained for the Marathon coating (set at 100).

as evidenced by the non-stick performance lasting more than 8 times longer than a non-diamond containing ceramic coating composition, and even lasting about 5 times longer than a diamond additive containing ceramic coating (comprising diamonds and uncoloured mica particles). This extremely high resistance to salt water induced degradation can also be seen from the DW+2TS+SW test (comprising a dishwasher, temperature shock and salt water boiling steps, representing domestic use), where the coating comprising diamonds and blue coloured mica particles keeps it non-stick properties about 3 times longer than a non-diamond containing ceramic coating composition, and about 50% longer than a diamond additive containing ceramic coating (comprising diamonds and uncoloured mica particles). These impressive improvements in the Salt Water Boiling—Fried Egg data, and supported by the (1D+2TS+SW) data (which also includes a salt water boiling step) clearly demonstrate that the inventors have found a solution to

TABLE 2

| parameter | Coating | | | | |
|---|---|---|---|---|---|
| | D + CM | DA | Marathon | Endurance2 | Thermolon NS |
| Temp Resistance (° C.) | 450 | 450 | 450 | 450 | 450 |
| Initial Fried Egg Grade | 5 | 5 | 5 | 5 | 5 |
| Pencil Hardness (H) | 10 | 10 | 9 | 9 | 9 |
| DW + 2TS + SW cycles) | 15 | 10 | 5 | 3 | 3 |
| 5% NaCl-Fried Egg (h) | 51 | 9 | 6 | 6 | 3 |
| Abrasion-Fried Egg (cycles) | 1,500 | 750 | 500 | 250 | 250 |

TABLE 3 (*)

| parameter | Coating | | | | |
|---|---|---|---|---|---|
| | D + CM | DA | Marathon | Endurance2 | Thermolon NS |
| DW + 2TS + SW (% of Marathon) | 300 | 200 | 100 | 60 | 60 |
| 5% NaCl-Fried Egg (% of Marathon) | 850 | 150 | 100 | 100 | 50 |
| Abrasion-Fried Egg (% of Marathon) | 300 | 150 | 100 | 100 | 50 |

(*) values in Table 3 correspond to Table 2, but rebased such that the ThermoIon Marathon coating scores 100

These results clearly indicate that the addition of a diamond additive comprising diamonds and blue coloured mica particles to a particular non-stick ceramic coating has a synergistic effect on the durability of the non-stick properties of the coating, as evidenced by the longer lasting non-stick performance under conditions reflecting domestic use (1DW+2TS+SW and the 5% NaCl boiling test) and the improved wear resistance of the non-stick properties (Abrasion-Fried Egg test). In particular, the ceramic coating of the present invention kept its non-stick performance exceptionally and surprisingly well in contact with boiling salt water, increase the resistance of a ceramic coating against salt-induced deterioration of the non-stick performance (food release properties).

Example 5

In this example, the coating characteristics of a coating according to the present invention, but comprising mica particles of different colours (blue, red or green) are evaluated using (1DW+2TS+SW), the 5% NaCl boiling and the Abrasion-Fried Egg test procedures as set out in Example 3, and compared to a coating with diamond and non-coloured mica according to WO2016188946. The ceramic coating compositions comprising a diamond additive and the resulting coatings are prepared as in Example 3. The results are summarized in Table 4.

TABLE 4

| Parameter | NS (no DA)[a] | DA[b] | DA + blue mica | DA + green mica | DA + red mica |
|---|---|---|---|---|---|
| 1D + 2TS + SW (cycles) | 5 | 10 | 16 | 16 | 17 |
| 5% NaCl-Fried Egg | 6 h | 9 h | 36 h | 33 h | 39 h |
| Abrasion-Fried Egg (cycles) | 500 | 750 | 1,250 | 1,000 | 1,250 |

[a]data from table 3 for the ThermoIon ™ Marathon coating, a commercially available ThermoIon ™ high quality non-stick ceramic coating without diamond additive;
[b]coating according to WO2016188946, example 1, comprising a Diamond Additive, comprising diamond particles and colourless mica particles The results presented in Table 4 demonstrate that the surprising results and advantageous effects on the non-stick durability shown for a ceramic coating composition comprising a diamond additive comprising blue mica particles (see examples 3 and 4) can also be seen for a ceramic coating composition comprising a diamond additive comprising green or red mica particles. In addition, these results were found to be reproducible: a duplicate experiment yielded similar results.

The results presented in the present application clearly demonstrate that the addition of a diamond additive comprising diamonds and blue, red or green coloured mica particles to a non-stick ceramic coating has a synergistic effect on the durability of the non-stick properties of the coating, as evidenced by the longer lasting non-stick performance under conditions reflecting domestic use (1DW+2TS+SW and the 5% NaCl boiling test) and the improved wear resistance of the non-stick properties (Abrasion-Fried Egg test), even greatly surpassing the performance of a non-stick ceramic coating comprising diamond particles and non-coloured (colourless) mica particles.

Indeed, a ceramic coating according to the present invention kept its non-stick performance exceptionally and surprisingly well in contact with boiling salt water, as evidenced by the non-stick performance lasting up to 6 times longer than a high quality non-diamond containing ceramic coating composition, and even lasting upto about 5 times longer than a diamond additive containing ceramic coating (comprising diamonds and uncoloured mica particles).

These impressive improvements in the Salt Water Boiling—Fried Egg data, and supported by the (1D+2TS+SW) data (which also includes a salt water boiling step) clearly demonstrate that the inventors have found a solution (i.e. the use of diamonds in combination with red, blue or green mica particles) for increasing the resistance of a ceramic coating against salt-induced deterioration of the non-stick performance (food release properties).

The invention claimed is:

1. A ceramic coating composition for providing a non-stick ceramic coating when applied on an artefact, comprising a base ceramic coating composition and 0.2 wt %-2 wt % of a diamond additive, with wt % compared with the total weight of the ceramic coating composition, wherein the diamond additive comprises diamond particles and mica particles, wherein said mica particles comprises coloured mica particles, and wherein the coloured mica particles comprise natural or synthetic mica particles coated with a titanium dioxide and/or metal oxide layer.

2. The ceramic coating composition according to claim 1, wherein said mica particles comprises blue and/or green and/or red coloured mica particles.

3. The ceramic coating composition according to claim 1, wherein the thickness of the titanium dioxide and/or metal oxide layer is between 80 and 160 nm.

4. The ceramic coating composition according to claim 1 wherein the coloured mica particles comprise one or more of (i) blue mica particles, made up of natural or synthetic mica particles coated with a titanium dioxide and/or metal oxide layer between 100 and 140 nm; (ii) green mica particles, made up of natural or synthetic mica particles coated with a titanium dioxide and/or metal oxide layer between 140 and 160 nm; and/or (iii) red mica particles, made up of natural or synthetic mica particles coated with a titanium dioxide and/or metal oxide layer between 80 and 100 nm.

5. The ceramic coating composition according to claim 1 wherein the weight ratio diamond particles:mica particles ranges between 1:0.1 and 1:3.

6. The ceramic coating composition according to claim 5, wherein the weight ratio diamond particles:mica particles ranges between 1:1 and 1:3.

7. The ceramic coating composition according to claim 1 wherein the base ceramic coating composition is present at more than 90 wt % with wt % compared with the total weight of the ceramic coating composition.

8. The ceramic coating composition according to claim 1 wherein the base ceramic coating composition is a non-stick inorganic ceramic coating composition, a non-stick hybrid ceramic coating composition, or a non-stick sol-gel ceramic coating composition.

9. The ceramic coating composition according to claim 1, wherein the base ceramic coating composition is a sol-gel ceramic coating composition comprising:
(a) 11-20 wt % of a silane or an oligomer thereof as a binder;
(b) 19.5-41.5 wt % of a silica mixture;
(c) 0-19 wt % of a functional filler;
(d) 2-15 wt % a ceramic powder that emits far infrared radiation and anions;
with wt % compared with the total weight of the sol-gel ceramic composition.

10. The ceramic coating composition according to claim 9, wherein said ceramic powder that emits far-infrared radiation and anions comprises a far-infrared radiation-emitting material and an anion-emitting element.

11. The ceramic coating composition according to claim 9, wherein the base ceramic coating composition is a sol-gel ceramic coating composition comprising 3-19 wt % of a functional filler, with wt % compared with the total weight of the sol-gel ceramic composition.

12. Use of a ceramic coating composition according to claim 1 for coating an artefact.

13. An artefact provided with a dry film non-stick ceramic coating containing a ceramic coating composition according to claim 1, wherein the dry film non-stick ceramic coating comprises diamond particles and blue and/or green and/or red mica particles.

14. The artefact according to claim 13, wherein the dry film contains the ceramic coating composition as a top coat, and the dry film has (i) a scratch resistance of 10 to 15 N as measured by BS7069; (ii) an abrasion resistance of 20 000 to 90 000 cycles using a force of 45 N according to BS7069; (iii) a pencil hardness of greater than or equal to 10H at room temperature and at 200° C. according to EN 12983-1:1999; and/or a thermal conductivity of 2.4 to 2.8 $W \cdot m^{-1} K^{-1}$ measured according to ASTM E-1461.

15. The artifact according to claim 13, wherein the artefact is a cookware item.

16. A method for coating a surface of an artefact comprising the steps:
A) roughening of the surface of the artefact,
B) applying a base coat of a ceramic coating composition to the roughened surface,
C) applying a top coat of the ceramic coating composition according to claim 1 over the wet base coat, and
D) curing the base coat and top coat to obtain a dry film coating of the artefact.

17. A method for obtaining an artefact coated with the ceramic coating composition according to claim 1, comprising the steps of:
providing an artefact;
providing a first solution comprising a silica mixture, a functional filler, a ceramic powder that emits far-infrared ray-radiation and anions in a first container;
providing a second solution comprising silane or an oligomer thereof as a binder in a second container;
pre-agitating the first solution in the first container and the second solution in the second container;
mixing the first solution and the second solution, thereby obtaining a sol-gel ceramic coating composition comprising 11-20 wt % of a silane or an oligomer thereof as a binder; 19.5-41.5 wt % of a silica mixture; 0-19 wt % of a functional filler; 2-15 wt % a ceramic powder that emits far infrared radiation and anions, with wt % compared with the total weight of the sol-gel ceramic composition;
agitating and maturing the non-stick sol-gel ceramic composition;
adding a diamond additive comprising diamond particles and blue and/or green and/or red coloured mica particles to the non-stick sol-gel ceramic composition to obtain a ceramic coating composition containing 0.2 wt %-2 wt % diamond additive;
filtering the ceramic coating composition;
applying the ceramic coating composition onto the artefact as a base coating or a further coating; and
curing the ceramic coating composition, thereby obtaining an artefact coated with a film containing the ceramic coating composition.

18. A method for improving the salt water boiling resistance or the non-stick performance of a non-stick ceramic coating comprising adding 0.2 wt %-2 wt % of diamond additive to a ceramic coating composition, with wt % compared to the total weight of the ceramic coating composition, wherein said diamond additive comprises diamond particles and blue and/or green and/or red mica particles, wherein the blue and/or green and/or red mica particles comprise natural or synthetic mica particles coated with a titanium dioxide and/or metal oxide layer.

* * * * *